(12) United States Patent
Holmstrom et al.

(10) Patent No.: US 11,273,684 B2
(45) Date of Patent: Mar. 15, 2022

(54) METHODS AND SYSTEMS FOR AUTONOMOUS CLIMATE CONTROL OPTIMIZATION OF A TRANSPORT VEHICLE

(71) Applicant: THERMO KING CORPORATION, Minneapolis, MN (US)

(72) Inventors: Katherine Holmstrom, Minneapolis, MN (US); Scott Wenger, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 480 days.

(21) Appl. No.: 16/147,708

(22) Filed: Sep. 29, 2018

(65) Prior Publication Data

US 2020/0101818 A1     Apr. 2, 2020

(51) Int. Cl.
*B60H 1/00*     (2006.01)

(52) U.S. Cl.
CPC ......... *B60H 1/00771* (2013.01); *B60H 1/008* (2013.01); *B60H 1/00742* (2013.01); *B60H 1/00785* (2013.01)

(58) Field of Classification Search
None
See application file for complete search history.

(56) References Cited

U.S. PATENT DOCUMENTS

| | | |
|---|---|---|
| 3,875,483 A | 4/1975 | Farr |
| 5,104,037 A | 4/1992 | Karg et al. |
| 6,280,320 B1 | 8/2001 | Paschke et al. |
| 6,487,869 B1 | 12/2002 | Sulc et al. |
| 6,518,727 B2 | 2/2003 | Oomura et al. |

(Continued)

FOREIGN PATENT DOCUMENTS

| | | |
|---|---|---|
| CN | 2456117 | 10/2001 |
| CN | 1885660 | 12/2006 |

(Continued)

OTHER PUBLICATIONS

Extended European Search Report, issued in the corresponding European patent application No. 19200003.2, dated Jan. 28, 2020, 7 pages.

(Continued)

*Primary Examiner* — Truc M Do
(74) *Attorney, Agent, or Firm* — Hamre, Schumann, Mueller & Larson, P.C.

(57) ABSTRACT

A method for autonomous climate control optimization of a transport vehicle having a climate control system is provided. The method includes a controller receiving geolocation specific data providing location information of the transport vehicle. The method also includes the controller receiving climate control data providing operational status information of the climate control system. The method also includes the controller receiving passenger/load data providing passenger/load information travelling in the transport vehicle. Also, the method includes the controller generating adjustment instructions of the climate control system based on the geolocation specific data, the climate control data, and the passenger/load data. Further, the method includes adjusting operation of the climate control system based on the adjustment instructions.

17 Claims, 4 Drawing Sheets

(56) References Cited

U.S. PATENT DOCUMENTS

| | | |
|---|---|---|
| 6,560,980 B2 | 5/2003 | Gustafson et al. |
| 6,600,237 B1 | 7/2003 | Meissner |
| 6,631,080 B2 | 10/2003 | Trimble et al. |
| 6,688,125 B2 | 2/2004 | Okamoto et al. |
| 6,753,692 B2 | 6/2004 | Toyomura et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Fee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,760,115 B2 | 6/2014 | Kinser et al. |
| 8,764,469 B2 | 7/2014 | Lamb |
| 8,818,588 B2 | 8/2014 | Ambrosio et al. |
| 8,862,356 B2 | 10/2014 | Miller |
| 8,924,057 B2 | 12/2014 | Kinser et al. |
| 8,978,798 B2 | 5/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 * | 4/2016 | Mitchell ............... G06Q 10/083 |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 * | 12/2017 | Robinson ............... G01K 3/04 |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2005/0057210 A1 | 3/2005 | Ueda et al. |
| 2006/0284601 A1 | 12/2006 | Salasoo et al. |
| 2007/0052241 A1 | 3/2007 | Pacy |
| 2007/0131408 A1 | 6/2007 | Zeigler et al. |
| 2007/0192116 A1 | 8/2007 | Levitt |
| 2008/0023965 A1 | 1/2008 | Cagliari et al. |
| 2009/0121798 A1 | 5/2009 | Levinson |
| 2009/0122901 A1* | 5/2009 | Choi ............... H04L 5/0039 375/267 |
| 2009/0126901 A1 | 5/2009 | Hegar et al. |
| 2009/0178424 A1 | 7/2009 | Hwang et al. |
| 2009/0195349 A1 | 8/2009 | Frader-Thompson et al. |
| 2009/0228155 A1* | 9/2009 | Slifkin ............... F25D 29/003 700/299 |
| 2009/0229288 A1 | 9/2009 | Alston et al. |
| 2009/0314019 A1 | 12/2009 | Fujimoto et al. |
| 2009/0320515 A1 | 12/2009 | Bischofberger et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0208378 A1 | 8/2011 | Krueger et al. |
| 2011/0224841 A1 | 9/2011 | Profitt-Brown et al. |
| 2011/0241420 A1 | 10/2011 | Hering et al. |
| 2012/0000212 A1 | 1/2012 | Sanders et al. |
| 2012/0116931 A1 | 5/2012 | Meyers |
| 2012/0198866 A1 | 8/2012 | Zeidner |
| 2012/0310376 A1* | 12/2012 | Krumm ............... G05B 15/02 700/31 |
| 2012/0310416 A1 | 12/2012 | Tepper et al. |
| 2013/0000342 A1 | 1/2013 | Blasko et al. |
| 2013/0073094 A1* | 3/2013 | Knapton ............... G05B 13/02 700/278 |
| 2013/0088900 A1 | 4/2013 | Park |
| 2013/0158828 A1 | 6/2013 | McAlister |
| 2013/0231808 A1 | 9/2013 | Flath et al. |
| 2014/0026599 A1 | 1/2014 | Rusignuolo et al. |
| 2014/0060097 A1 | 3/2014 | Perreault |
| 2014/0230470 A1 | 8/2014 | Cook |
| 2014/0265560 A1 | 9/2014 | Leehey et al. |
| 2015/0081212 A1 | 3/2015 | Mitchell et al. |
| 2015/0188360 A1 | 7/2015 | Doane et al. |
| 2015/0231948 A1 | 8/2015 | Kennedy |
| 2015/0246593 A1 | 9/2015 | Larson et al. |
| 2015/0306937 A1* | 10/2015 | Kitamura ............ B60H 1/00764 701/36 |
| 2015/0344044 A1* | 12/2015 | Yuasa ............... B60H 1/00821 165/11.1 |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0144764 A1* | 5/2016 | Dutta ............... B60H 1/00364 62/64 |
| 2016/0280040 A1 | 9/2016 | Connell et al. |
| 2016/0285416 A1 | 9/2016 | Tiwari et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0029436 A1 | 2/2018 | Zaeri et al. |
| 2018/0029488 A1 | 2/2018 | Sjodin |
| 2018/0111441 A1 | 4/2018 | Menard et al. |
| 2018/0154723 A1 | 6/2018 | Anderson et al. |
| 2018/0170398 A1 | 6/2018 | Miller et al. |
| 2018/0201092 A1* | 7/2018 | Ahuja ............... B60H 1/00742 |
| 2018/0203443 A1 | 7/2018 | Newman |
| 2018/0222278 A1 | 8/2018 | Mizuma |
| 2018/0334012 A1* | 11/2018 | Geller ............... B60H 1/00392 |
| 2018/0342876 A1 | 11/2018 | Agnew et al. |
| 2018/0342877 A1 | 11/2018 | Yoo et al. |

(56) References Cited

U.S. PATENT DOCUMENTS

| | | |
|---|---|---|
| 2018/0356870 A1 | 12/2018 | Rusignuolo |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1* | 10/2019 | Badger, II .......... B60H 1/00771 |
| 2020/0086712 A1 | 3/2020 | Schumacher et al. |
| 2020/0086744 A1 | 3/2020 | Schumacher et al. |
| 2020/0101820 A1 | 4/2020 | Wenger et al. |

FOREIGN PATENT DOCUMENTS

| | | |
|---|---|---|
| CN | 2912069 | 6/2007 |
| CN | 1017135// | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2010065476 | 6/2010 |
| WO | 2011066468 | 6/2011 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

(56) References Cited

OTHER PUBLICATIONS

U.S. Appl. No. 16/236,938, titled "Systems and Methods for Smart Load Shedding of a Transport Vehicle While in Transit", filed Dec. 31, 2018, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
Provisional U.S. Appl. No. 62/897,833, titled "Optimized Power Distribution To Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/911,692, titled "Climate Controlled Vehicle, Transport Climate Control Equipment, Method of Retrofitting a Vehicle and Method of Operation", filed Jun. 25, 2020, 36 pages.
"The Role of Thermal Plume in Person-to-Person Contaminant Cross Transmission"; Yang et al., 2017 Winter Conference, Seminar 36—Modeling and Control of the Personal Microenvironment, 5 pages.

\* cited by examiner

METHODS AND SYSTEMS FOR AUTONOMOUS CLIMATE CONTROL OPTIMIZATION OF A TRANSPORT VEHICLE

FIELD

Embodiments of this disclosure relate generally to a climate control system for a transport vehicle. More specifically, the embodiments relate to methods and systems for autonomous climate control optimization of a transport vehicle.

BACKGROUND

A climate control system, (such as a heating, ventilation, and air conditioning (HVAC) system for a passenger vehicle (e.g., a passenger bus, passenger railcar, etc.), a transport refrigeration system (TRS) for a transport unit (e.g., a truck, a container (such as a container on a flat car, an intermodal container, etc.), a box car, a semi-tractor, a bus, or other similar transport unit), etc. may be included on a transport vehicle to condition air of an internal space (e.g., passenger compartment, cargo space, etc.) of the transport vehicle. In some transport vehicles, the climate control system can be installed externally (e.g., on a rooftop of the transport vehicle, on a front wall of the transport vehicle, etc.). The climate control system can provide a comfortable environment for the passengers in the transport vehicle or a desired environment for cargo stored in the transport vehicle.

SUMMARY

This disclosure relates generally to a climate control system in a transport vehicle. More specifically, the embodiments relate to methods and systems for autonomous climate control optimization of a transport vehicle.

In particular, the embodiments described herein can combine geolocation specific data, climate control data, and passenger/load data to provide autonomous control of a climate control system for a transport vehicle without user/customer input. In some embodiments, the embodiments described herein can be used to automatically control an operating mode of the climate control system and/or a desired temperature setpoint, a desired humidity setpoint and/or an optimal load environment of the internal space (e.g., passenger compartment, cargo space, etc.) of the transport vehicle.

Accordingly, the embodiments described herein can provide autonomous control of the climate control system for maximum passenger comfort and/or optimal load environment with reduced energy utilization. In particular, the embodiments described herein can account for temperature and humidity fluctuations in the internal space that can be the result of, for example, the number and duration of passengers travelling in the passenger compartment, the type of cargo stored in the cargo space, the ambient temperature and ambient humidity at the geographic location where the transport vehicle is located, etc. The embodiments described herein can also avoid reliability and/or cost concerns often associated with conventional climate control systems.

The embodiments described herein can provide optimization strategies to account for external and internal variables that can affect performance of the climate control system. In particular, the embodiments described herein can account for external variables such as failure or out of calibration conditions of ambient temperature or humidity sensors typically disposed on an outside portion of the transport vehicle. The embodiments described herein can account for internal variables such as uneven distribution of temperature or humidity sensors within an internal space of the transport vehicle thereby preventing an accurate depiction of temperature and humidity fluctuations within the internal space. Also, the embodiments described herein can autonomously adjust the climate control system to account for sporadic changes in the number and duration of passengers (e.g., people, animals, etc.) that ingress and egress the transport vehicle during transit in an energy efficient manner.

The embodiments described herein can provide an automated passenger counter (APC) unit that is operable to track the number and duration of passengers that sporadically ingress and egress the transport vehicle. This data can be used by the climate control system to calculate the relative humidity within the transport vehicle at any given time and thereby inform the control strategy of the climate control system.

The embodiments described herein can obtain and use real-time weather data (e.g., ambient temperature and humidity data external to the location of the transport vehicle) from, for example, an internet weather data service. This data can be used to optimize performance of the climate control system and specifically this data can be used to allow for automated adjustment of an operating mode of the climate control system and/or one or more temperature and/or humidity setpoints within an internal space of the transport vehicle.

Automatic optimization of the climate control system based on real-time weather data and/or data obtained from an APC unit can reduce energy utilization of the climate control system while simultaneously providing passenger comfort or an optimal environment for any type of cargo.

In some embodiments, an operating mode of the climate control system can be autonomously adjusted based on at least an ambient temperature at the location of the transport vehicle and a projected humidity level within the internal space of the transport vehicle. The projected humidity level within the internal space can be determined based on a measured internal space humidity level within the internal space and passenger/load data providing passenger/load information travelling in the transport vehicle.

In some embodiments, an operating mode of the climate control system can be autonomously adjusted based on at least a projected internal space temperature and a projected internal space humidity level within the internal space. The projected internal space temperature can be determined based on a measured temperature level within the internal space and passenger/load data providing passenger/load information travelling in the transport vehicle. The projected humidity level within the internal space can be determined based on a measured internal space humidity level within the internal space and passenger/load data providing passenger/load information travelling in the transport vehicle.

In some embodiments, a discharge temperature setpoint for conditioned air discharged into the internal space via the climate control system can be autonomously adjusted based on at least an ambient temperature level at the location of the transport vehicle and an ambient humidity level at the location of the transport vehicle. The discharge temperature setpoint can be adjusted to meet a desired internal space temperature setpoint.

In some embodiments, a discharge temperature setpoint for conditioned air discharged into the internal space via the climate control system and a desired internal space temperature setpoint can be autonomously adjusted based on at least passenger/load data providing passenger/load information travelling in the transport vehicle.

In some embodiments, a discharge temperature setpoint for conditioned air discharged into the internal space via the climate control system and a desired internal space temperature setpoint can be autonomously adjusted based on at least geolocation specific data. When the transport vehicle is traveling along a fixed specific route, the climate control system can be autonomously adjusted based on a location of the transport vehicle along the fixed specific route.

In one embodiment, a method for autonomous climate control optimization of a transport vehicle having a climate control system is provided. The method includes a controller receiving geolocation specific data providing location information of the transport vehicle. The method also includes the controller receiving climate control data providing operational status information of the climate control system. The method also includes the controller receiving passenger/load data providing passenger/load information travelling in the transport vehicle. Also, the method includes the controller generating adjustment instructions of the climate control system based on the geolocation specific data, the climate control data, and the passenger/load data. Further, the method includes adjusting operation of the climate control system based on the adjustment instructions.

In another embodiment, a climate control system for a transport vehicle is provided. The climate control system includes a refrigeration circuit and a controller. The refrigeration circuit is configured to control an environmental condition of an internal space of the transport vehicle. The refrigeration circuit includes a compressor, an exterior heat exchanger, and an interior heat exchanger. The controller is configured to control operation of the climate control system. In particular, the controller is configured to receive geolocation specific data providing location information of the transport vehicle, receive climate control data providing operational status information of the climate control system, receive passenger/load data providing passenger/load information travelling in the transport vehicle, and generate adjustment instructions of the climate control system based on the geolocation specific data, the climate control data, and the passenger/load data. The climate control system is configured to adjust operation of the climate control system based on the adjustment instructions.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates to a climate control system in a transport vehicle. More specifically, the embodiments relate to methods and systems for autonomous climate control optimization of a transport vehicle.

A climate control system may be generally configured to control one or more environmental conditions (e.g., temperature, humidity, atmosphere, air quality, etc.) in an internal space (e.g., passenger compartment, cargo space, etc.) of a transport vehicle (e.g., a passenger bus, a passenger railcar, a truck, a container (such as a container on a flat car, an intermodal container, etc.), a box car, a semi-tractor, etc.). Generally, the internal space of a transport vehicle can be supplied with fresh air (e.g., outside air) and/or conditioned air (e.g., air conditioned by a refrigeration circuit of the climate control system) by the climate control system.

Figure 1A:
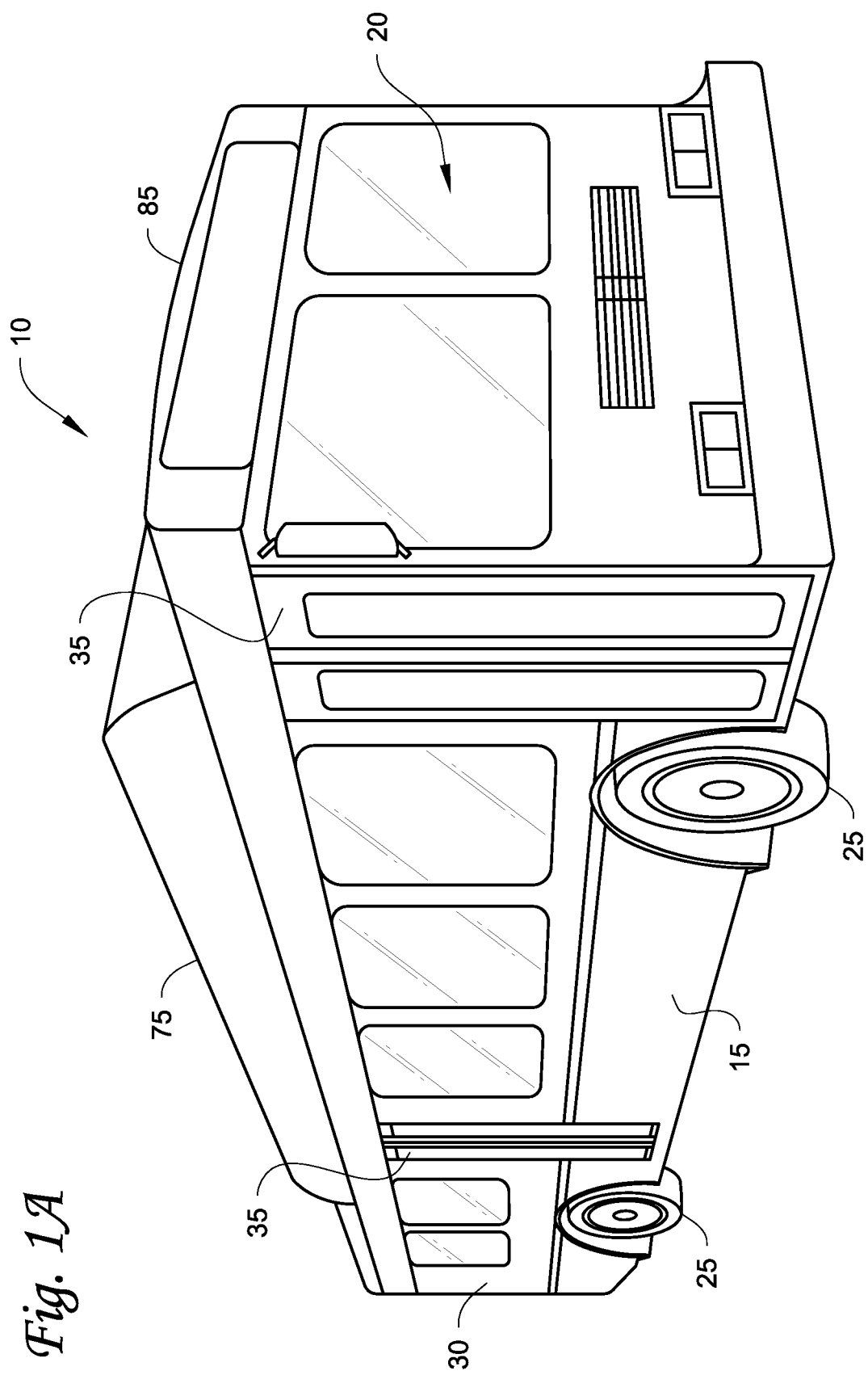
FIG. 1A is a perspective view of a passenger vehicle including a climate control system, according to one embodiment.

FIG. 1A is a perspective view of a vehicle 10 including a climate control system, according to one embodiment. In the embodiment illustrated in FIG. 1A, the vehicle 10 is a mass-transit bus that can carry passenger(s) (not shown) to one or more destinations. In other embodiments, the vehicle 10 can be a school bus, railway vehicle, subway car, or other commercial vehicle that carries passengers. Hereinafter, the term "vehicle" shall be used to represent all such passenger vehicles, and should not be construed to limit the scope of the application solely to mass-transit buses.

FIG. 1A shows that the vehicle 10 includes a frame 15, a passenger compartment 20 supported by the frame 15, wheels 25, and a compartment 30. The frame 15 includes doors 35 that are positioned on a side of the vehicle 10. As shown in FIG. 1A, a first door 35 is located adjacent to a forward end of the vehicle 10, and a second door 35 is positioned on the frame 15 toward a rearward end of the vehicle 10. Each door 35 is movable between an open position and a closed position to selectively allow access to the passenger compartment 20. The vehicle 10 also includes a climate control system 75 attached to the frame 15 on a roof 85 of the vehicle 10. The climate control system 75 includes a refrigeration circuit (see FIG. 2) and is configured to provide conditioned air within the passenger compartment 20.

The compartment 30 is located adjacent the rear end of the vehicle 10, can include a power system (see FIG. 2) that is coupled to the frame 15 to drive the wheels 25. In some embodiments, the compartment 30 can be located in other locations on the vehicle 10 (e.g., adjacent the forward end, etc.).

Figure 1B:
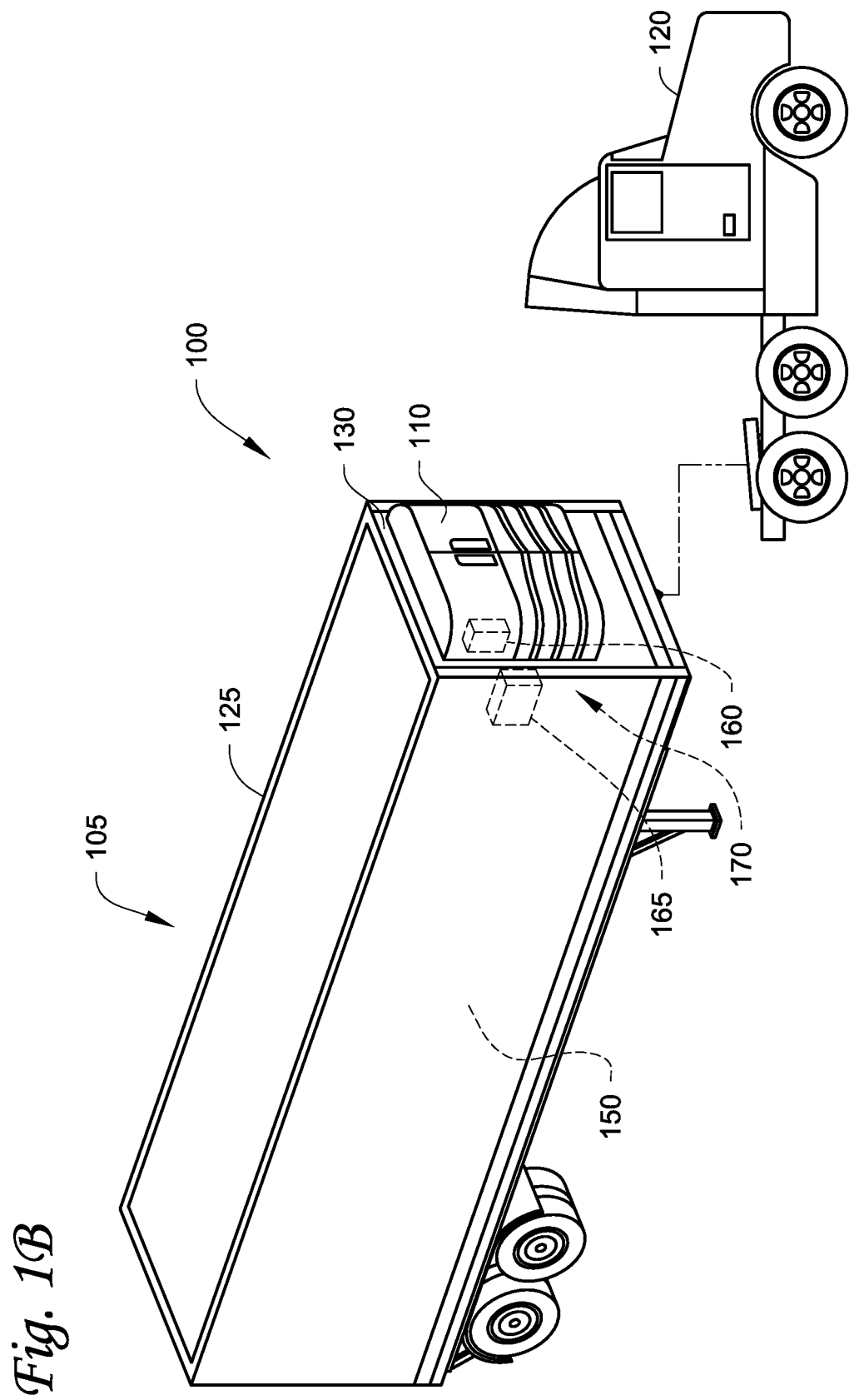
FIG. 1B is a perspective view of a refrigerated transport unit attached to a tractor, according to one embodiment.

FIG. 1B illustrates one embodiment of a refrigerated transport unit 105 attached to a tractor 120. The refrigerated transport unit 105 includes a climate control system 100 for a transport unit 125. The tractor 120 is attached to and is configured to tow the transport unit 125. The transport unit 125 shown in FIG. 1B is a trailer. It will be appreciated that the embodiments described herein are not limited to tractor and trailer units, but can apply to any type of transport unit (e.g., a container on a flat car, an intermodal container, etc.), a truck, a box car, or other similar transport unit. The transport unit 125 can include one or more doors (not shown) that are movable between an open position and a closed position to selectively allow access to a cargo space 150.

The climate control system 100 includes a climate control unit (CCU) 110 that provides environmental control (e.g. temperature, humidity, air quality, etc.) within the cargo space 150 of the transport unit 125. The climate control system 100 also includes a climate controller 170 and one or more sensors (not shown) that are configured to measure one or more parameters of the climate control system 100 and communicate parameter data to a climate controller 170.

The CCU 110 is disposed on a front wall 130 of the transport unit 125. In other embodiments, it will be appreciated that the CCU 110 can be disposed, for example, on a rooftop or another wall of the transport unit 125. The CCU 110 includes a refrigeration circuit (see FIG. 2) for conditioning air to be provided within the cargo space 150. The CCU 110 can also include a power system (see FIG. 2) to power components of the climate control system 100 (e.g., a compressor, one or more fans and blowers, one or more sensors, one or more solenoid valves, etc.)

The programmable climate controller 170 may comprise a single integrated control unit 160 or that may comprise a distributed network of climate controller elements 160, 165. The number of distributed control elements in a given network can depend upon the particular application of the principles described herein. The climate controller 170 is configured to control operation of the climate control system 100.

Figure 2:
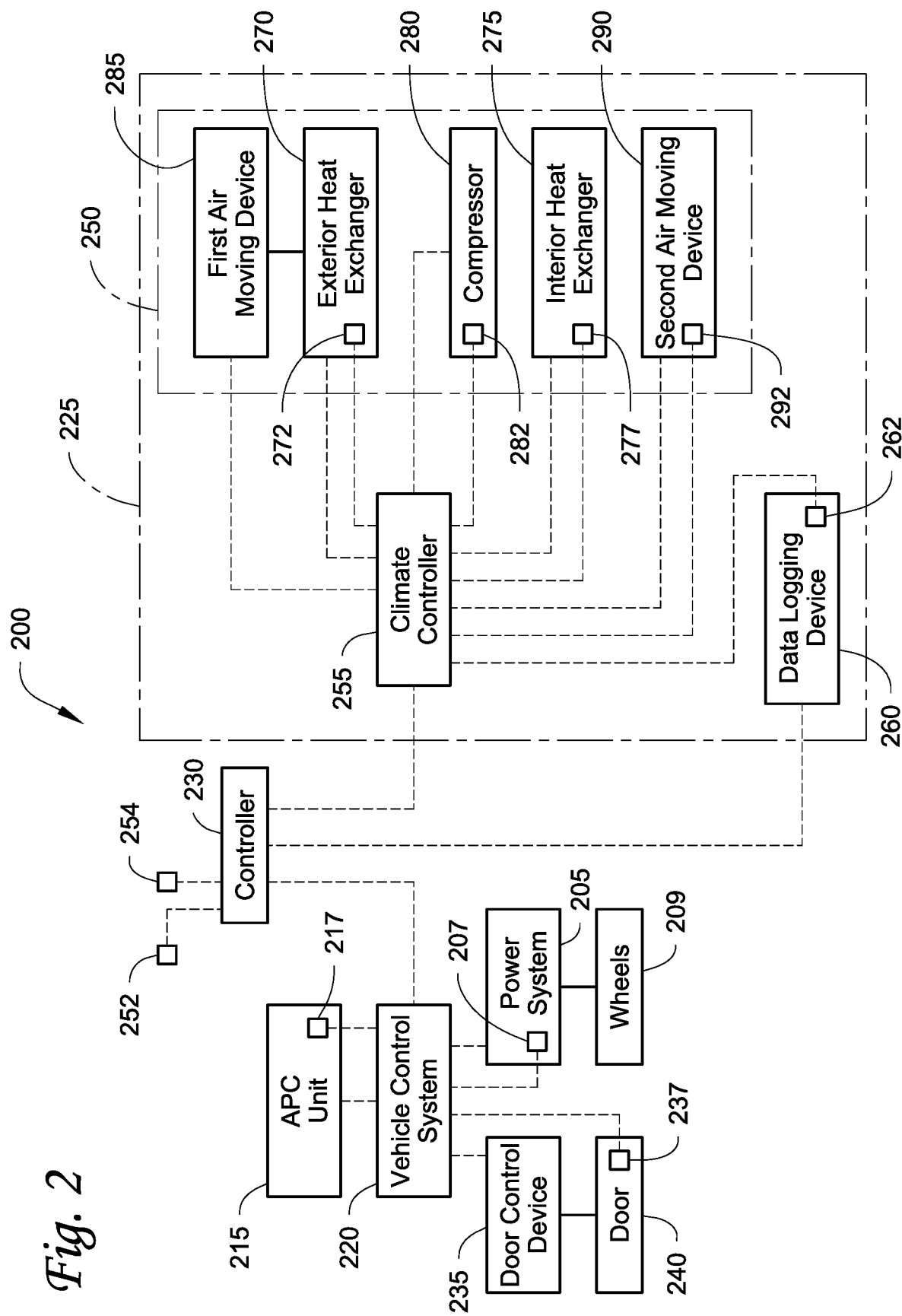
FIG. 2 is a schematic view of components of the transport vehicle shown in either of FIGS. 1A and 1B, according to one embodiment.

FIG. 2 illustrates a schematic view of components of a transport vehicle 200 such as the transport vehicle 10 shown in FIG. 1A or the transport unit 100 shown in FIG. 1B. FIG. 2 shows a power system 205 that can include a prime mover (e.g., an internal combustion engine), or alternatively, a hybrid engine that includes an electrical power system coupled to the prime mover. In other embodiments, the power system 205 can be a fully electrical power system (e.g., energy storage device) without a corresponding prime mover. Hereinafter, the term "power system" shall be used to represent all such power systems, and should not be construed to limit the scope of the application solely to prime movers.

In the embodiment shown in FIG. 2, the power system 205 can provide most, if not all of the power to vehicle components and accessories, in addition to powering wheels 209 (e.g., the wheels 25 shown in FIG. 1A), and can include an "off" state and an "on" state. Generally, the vehicle 200 is operable at one or more speeds, and the power system 205 can be the main driving component or mechanism for the speed that the vehicle 200 travels. The power system 205 can be further operable at relatively high loads and relatively low loads. The load that the power system 205 is under is defined by the amount of work per time unit that must be provided by the power system 205 to move and operate the vehicle 200. In other words, the load of the power system 205 can be defined by the amount of output power that must be provided by the power system 205 to move and operate the vehicle 200. For example, the power system 205 can be under relatively high loads when the vehicle 200 is moving uphill or over rough terrain. The power system 205 can be under relatively low loads when the vehicle 200 is moving downhill, when the vehicle 200 is moving over relatively flat terrain, or when the power system 205 is idling. Generally, a change in the load of the power system 205 can be indicated by a change in the output power of the power system 205 that is measured, for example, in kilowatts or horsepower.

In some embodiments, the power system 205 can be dedicated to powering a climate control system 225. In these embodiments, the power system 205 may not power the wheels 209. In these embodiments, the power system 205 can be located in a TRU (e.g., the TRU 110) or can be disposed apart from the TRU such as in an undermount configuration (e.g., as a separate generator set or the like).

A power system sensor 207 is coupled to the power system 205 to sense a condition and/or usage of the power system 205, and to generate a signal indicative of the power system condition. In some embodiments, the power system sensor 207 can be configured to detect the load under which the power system 205 is operating. In these embodiments, the power system sensor 207 can generate a signal indicative of the power system load. In other embodiments, the sensor 207 can be configured to detect startup of the power system 205 from the "off" state.

With continued reference to FIG. 2, the transport vehicle 200 can also include an automated passenger counter (APC) unit 215 that is operable to track the number and duration of passengers (e.g., people, animals, etc.) in the internal space of the transport vehicle 200 at any time. The APC unit 215 includes an APC sensor 217 that senses when a passenger enters or exits the transport vehicle 200. It has been found that passengers (e.g., people, animals, etc.) have natural convection (i.e., thermal plume) that radiates heat and moisture to the surrounding environment. A conditioned internal space can be affected by the thermal plume surrounding a passenger. Thus, data from the APC unit 215 can be used to calculate a relative humidity within the internal space of the transport vehicle 200 at any given time.

The transport vehicle 200 also includes a vehicle control system 220, a climate control system 225 (e.g., the climate control system 75 shown in FIG. 1A and the climate control system 100 shown in FIG. 1B), and a controller 230 in communication with the vehicle control system 220 and the climate control system 225. The vehicle control system 220 can be located anywhere on the transport vehicle 200, and is in communication electrical and/or mechanical components (not shown) of the transport vehicle 200. The vehicle control system 220 is also in communication with a door control device 235, the power system 205, and the APC unit 215 to receive the respective signals from a door sensor 237, the power system sensor 207, and the vehicle position sensor 217. In some embodiments, additional vehicle conditions of the transport vehicle 200 may also be sensed by one or more sensors.

The transport vehicle 200 includes a door control device 235 that is coupled to each door 240 (only one shown). The door control device 235 is operable to move the doors 240 between the respective open positions and closed positions. In some embodiments, the door control device 235 is manually operated by an operator of the transport vehicle 200 to open and close the doors 240. In other embodiments, the door control device 235 can automatically open and close the doors 240 (e.g., via electronic signals, etc.). In still other embodiments, one door control device 235 can be provided for each door 240 of the vehicle 200 to independently open and close each door 240.

The door sensor 237 is coupled to each door 240 to sense when and for how long one or all doors 240 are in the open position, and to generate a signal indicative of the respective positions and durations of the doors 240. For example, the door sensor 237 can generate a first signal indicative of one or all doors 240 in the open position and the duration of the open position, and can generate a second signal indicative of the doors 240 in the closed position and the duration of the closed position. The door opening frequency and duration information obtained by the door sensor 237 can be combined with information obtained from the APC unit 215 to determine the effect of thermal plume within the internal space.

Alternatively, no signal may be affirmatively generated by the door sensor 237 when the doors 240 are in the closed position (i.e., the sensor is "silent" when the doors 240 are in the closed position). However, the silence of the door sensor 237 when the doors 240 are closed can be indicative of the doors 240 in the closed position. In some embodiments, one door sensor 237 may be coupled to both or all doors 240. In other embodiments, a door sensor 237 may be provided for each door 240 to independently sense the position of the respective door 240.

FIG. 2 shows that the climate control system 225 includes a refrigeration circuit 250, a climate controller 255, and a data logging device 260. The refrigeration circuit 250 is a vehicle climate control circuit that can be operable to control one or more environmental conditions (e.g., temperature, humidity, atmosphere, air quality, etc.) of the internal space of the transport vehicle 200 based on geolocation specific data, climate control data, and passenger/load data. The refrigeration circuit 250 includes an exterior heat exchanger 270, an interior heat exchanger 275, a compressor 280, a first air moving device 285, and a second air moving device 290. In the illustrated embodiment, the first and second air moving devices 285, 290 are fans. The refrigeration circuit 250 may also include additional components (not shown). A working fluid (e.g., refrigerant) flows through the refrigeration components to provide conditioned air to the internal space (e.g., the passenger compartment 20 shown in FIG. 1A and the cargo space 150 shown in FIG. 1B).

The speed of the refrigeration circuit 250 can be defined as the speed of working fluid flow through the exterior heat exchanger 270 and/or the interior heat exchanger 275. The speed of the refrigeration circuit 250 can be also defined as the speed of the compressor 280, the speed of the first air moving device 285, and/or the speed of the second air moving device 290, in addition to the speed of other components of the refrigeration circuit 250.

In some constructions, the exterior heat exchanger 270 can cool heated working fluid that flows from the compressor 280 in a cooling mode of the refrigeration circuit 250. The exterior heat exchanger 270 may include a gas cooler, or alternatively a condenser, depending on the type of working fluid routed through the refrigeration circuit 250. In other constructions, the exterior heat exchanger 270 can heat cooled working fluid in a heating mode of the refrigeration circuit 250.

Although not shown, the interior heat exchanger 275 (e.g., evaporator, etc.) can be in fluid communication with the exterior heat exchanger 270 to receive cooled working fluid and to transfer heat from air passing over the interior heat exchanger 275 to the working fluid prior to the conditioned air entering the internal space. The compressor 280 is in fluid communication with the exterior heat exchanger 270 and the interior heat exchanger 275 to compress heated working fluid received from the interior heat exchanger 275 and to provide working fluid flow throughout the refrigeration circuit 250. In some embodiments, the compressor 280 can be a one-speed (e.g., On state and Off state) compressor. In other embodiments, the compressor 280 can be a two-speed compressor (e.g., high speed and low speed). In yet some other embodiments, the compressor 280 can be a variable speed compressor that can operate at multiple speeds. The speed of the compressor 280 can be based in part on a desired pressure of the working fluid within the refrigeration circuit 250.

Generally, the first and second air moving devices 285, 290 include fans or blowers that direct airflow across one or more components of the refrigeration circuit 250. In some embodiments, the first and second air moving devices 285, 290 can be one-speed (e.g., On state and Off state) moving devices. In other embodiments, the first and second air moving devices 285, 290 can be two-speed (e.g., high speed and low speed) moving devices. In some embodiments, the first and second air moving devices 285, 290 can be variable speed moving devices that can operate at multiple speeds. The first air moving device 285 is coupled to the exterior heat exchanger 270, and the speed of the first air moving device 285 can be based on desired airflow across the exterior heat exchanger 270. The first air moving device 285 can generally direct air across the exterior heat exchanger 270 to cool heated, compressed working fluid that flows from the compressor 280.

The second air moving device 290 is coupled to the interior heat exchanger 275, and the speed of the second air moving device 290 can be based on desired airflow across the interior heat exchanger 275. The second air moving device 290 can generally direct air across the interior heat exchanger 275 to condition air entering the internal space via heat transfer with cool working fluid flowing through the interior heat exchanger 275.

The climate controller 255 is in communication with the compressor 280 to control compressor capacity, and is in communication with the first and second air moving devices 285, 290 to control the speed of the first and second air moving devices 285, 290. The climate controller 255 is operable to vary the refrigeration circuit 250 between an "off" state and an "on" state, and to further control the capacity of the refrigeration circuit 250 based in part on the desired temperature of the internal space, and further based on ambient conditions adjacent to the climate control system 225. In some embodiments, the climate controller 255 can include a memory portion (not shown) that stores a desired temperature setpoint within the internal space, a desired humidity setpoint within the internal space, and a discharge temperature setpoint.

The climate controller 255 is also in communication with a discharge temperature sensor 292, an interior heat exchanger sensor 277, a compressor sensor 282, and an exterior heat exchanger sensor 272. When present, the climate controller 255 can also be in communication with one or more internal space temperature sensors 252 and/or one or more internal space humidity sensors 254. The climate controller 255 may also be in communication with other sensors (not shown) that are coupled to components of the refrigeration circuit 250. The discharge temperature sensor 292 is disposed adjacent to the second air moving device 290 to sense a discharge temperature of conditioned air directed into the internal space.

The interior heat exchanger sensor 277 is coupled to the interior heat exchanger 275 to sense a temperature of the working fluid flowing through the interior heat exchanger 275, and to generate a signal indicative of the working fluid temperature. In other embodiments, the interior heat exchanger sensor 277 can sense the temperature of air flowing over the interior heat exchanger 275. In still other embodiments, the interior heat exchanger sensor 277 can sense a pressure of working fluid that flows through the interior heat exchanger 275.

The compressor sensor 282 is coupled to the compressor 280 to sense a pressure of working fluid that flows through the compressor 280. In some embodiments, the compressor sensor 282 can monitor the pressure of the working fluid that enters the compressor 280 (i.e., the suction pressure). In other embodiments, the compressor sensor 282 can monitor the pressure of working fluid that exits the compressor 280 (i.e., the discharge pressure). In still other embodiments, the compressor sensor 280 may be configured to sense the discharge pressure and the suction pressure of the working fluid flowing through the compressor 280.

The exterior heat exchanger sensor 272 is coupled to the exterior heat exchanger 270 to sense a temperature of working fluid exiting the exterior heat exchanger 270, and to generate a signal indicative of the sensed temperature. In some embodiments, the exterior heat exchanger sensor 272 can be located in a refrigeration line (not shown) that is proximate to and downstream of the exterior heat exchanger 270.

The one or more internal space temperature sensors 252 can be disposed at various locations within the internal space to sense a temperature within the internal space. The one or more internal space humidity sensors 254 can be disposed at various locations within the internal space to sense humidity within the internal space.

The refrigeration circuit 250 can be operable at various capacities, ranging from a zero capacity in an Off state to a full capacity in an On state. The capacity of the refrigeration circuit 250 is the capacity at which the refrigeration circuit 250 is able to condition air that enters the internal space.

A full capacity of the refrigeration circuit 250 can correspond to a pull-down cooling mode of the climate control system 225, and a reduced capacity (i.e., a capacity that is less than full capacity) of the refrigeration circuit 250 can correspond to a reduced capacity cooling mode or a noise reduction mode of the climate control system 225. Generally, the speed of one or more climate control system components in the reduced capacity mode or the noise reduction mode are slower than the speed of the same components in the pull-down cooling mode, and operation of the climate control system 225 in the noise reduction mode can reduce perceived noise that emanates from the climate control system 225. For example, when the climate control system 225 operates at full capacity (i.e., in the pull-down cooling mode), the refrigeration circuit 250 can operate at a speed that can quickly reduce the temperature within the internal space from a near ambient temperature to a desired temperature setpoint. In some embodiments, when the climate control system 225 operates at a reduced capacity (e.g., in the reduced capacity mode, the noise reduction mode, etc.), the refrigeration circuit 250 can operate at a speed that is slower than the speed necessary to maintain the desired temperature setpoint of the internal space.

The climate control system 225 is configured to operate in a variety of operating modes including, for example, a continuous cooling mode, a cycle-sentry cooling mode, a pull-down cooling mode, a reduced capacity cooling mode, a heating mode, a defrost mode, an emissions (e.g., noise, $CO_2$, particular matter, nitrogen oxide, etc.) reduction mode, a fuel reduction mode, a humidity reduction mode, etc. The continuous cooling mode can allow the compressor 280 to continuously remain in an On state so that the refrigeration circuit 250 can provide cooled air into the internal space. The cycle-sentry cooling mode can allow the compressor 280 to operate in a pattern of On state and Off state cycles over a period of time so that the refrigeration circuit 250 can provide cooled air into the internal space. The pull-down cooling mode can allow the refrigeration circuit 250 to operate at a full capacity to quickly reduce the temperature within the internal space from a near ambient temperature to a desired temperature setpoint. The reduced capacity cooling mode can allow the refrigeration circuit 250 to operate at a reduced capacity to slow down or stop temperature reduction within the internal space. The heating mode can allow the refrigeration circuit 250 to provide heated air to the internal space to increase the temperature within the internal space. The defrost mode can allow the refrigeration circuit to defrost, for example, evaporator coils of the interior heat exchanger 275. The emissions reduction mode can allow the refrigeration circuit 250 to operate such that emissions of one or more of noise, $CO_2$, particular matter, nitrogen oxide, etc. from the climate control system 225 is reduced. The fuel reduction mode can allow the climate control system 225 to reduce the amount of fuel used to operate the climate control system 225. The humidity reduction mode can reduce humidity in the internal space by, for example, running the secondary air moving device 290 independently of the compressor 280.

The data logging device 260 is configured to receive and store real-time information regarding the transport vehicle 200 and the climate control system 225. The data logging device 260 can also operate as a telematics unit and transmit the real-time information regarding the transport vehicle 200 and the climate control system 225 to a host service. In some embodiments, the data logging device 260 can be a first party data logging and telematics device of the climate control system 225 or a third party data logging and telematics device that is separate from the climate control system 225. The data logging device 260 can also include a vehicle position sensor 262. The vehicle position sensor 262 can be a global positioning system sensor in communication with a global positioning system (not shown) that determines the location of the transport vehicle 200.

In some embodiments, the data logging device 260 can utilize, for example, a global system for mobile communications (GSM) or a general packet radio service (GPRS) to access real-time ambient temperature and/or humidity data external to the location of the transport vehicle 200. In some embodiments, the data logging device 260 can access the real-time ambient temperature and/or humidity information at the location determined by the vehicle position sensor 262 from, for example, the national oceanic and atmospheric administration (NOAA).

It will be appreciated that in other embodiments, the vehicle position sensor 262 can be part of, for example, the climate controller 255, the controller 230, the vehicle control system 220, or another device of the transport vehicle 200. Also, in some embodiments, the data logging device 260 can be embedded in or with the climate controller 255.

The controller 230 is disposed in the vehicle 200, and generally can be located anywhere on the vehicle 200. The controller 230 is in communication with the vehicle control system 220 and the climate control system 225 to monitor conditions of the vehicle 200 and the climate control system 225, and to control the climate control system 225 in response to the sensed temperature within the internal space and the sensed vehicle conditions. In some embodiments, the controller 230 can be a stand-alone controller 230 in addition to the vehicle control system 220 and the climate controller 255. In other embodiments, the vehicle control system 220 and/or the climate controller 255 can be a part of or subsumed in the controller 230.

The controller 230 is configured to receive geolocation specific data that provides location information of the transport vehicle, climate control data that provides operational status information of the climate control system, and passenger/load data that provides passenger/load information travelling in the transport vehicle. Based on the geolocation specific data, the climate control data, and the passenger/load data, the controller 230 can generate adjustment instructions of the climate control system 225 that can be used to adjust operation of the climate control system 225. Operation of the controller 230 is discussed in more detail with respect to FIG. 3.

Figure 3:
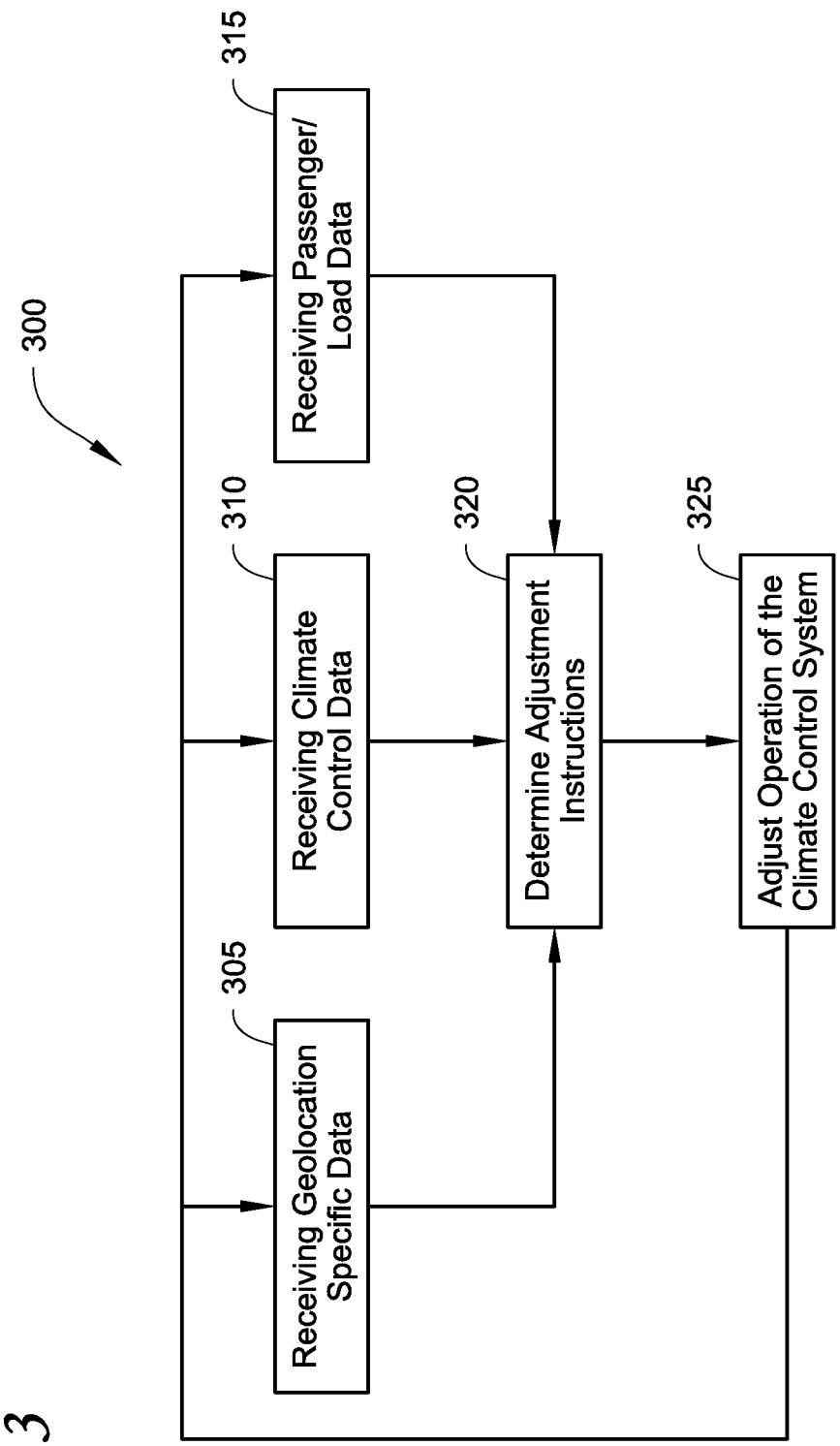
FIG. 3 is a flowchart of a method for autonomous climate control optimization of a transport vehicle having a climate control system, according to one embodiment.

FIG. 3 illustrates a flowchart of a method 300 for autonomous climate control optimization of the transport vehicle 200 having the climate control system 225. While the method 300 illustrates autonomous climate control optimization of the transport vehicle 200 using the controller 230, it will be appreciated that in other embodiments the climate controller 255, the vehicle control system 220 or the controller 230 could be used to implement the method 300. Also, as discussed above, in some embodiments, the vehicle control system 220 and/or the climate controller 255 can be a part of or subsumed in the controller 230. The method 300 begins concurrently at 305, 310, and 315.

At 305, the controller 230 receives geolocation specific data providing location information of the transport vehicle 200. The geolocation specific data can include, for example, real-time ambient temperature data at the location of the transport vehicle 200 and real-time ambient humidity data at the location of the transport vehicle 200. In some embodiments, the controller 230 can receive the geolocation specific data (including the real-time ambient temperature data and the real-time ambient humidity data) from the data logging device 260. In some embodiments, the geolocation specific data can include a location of the transport vehicle 200 along a fixed specific route. A fixed specific route can have pre-determined stopping points, shade/direct sun exposure based on time of day and nearby obstructions (such as, but not limited to, trees, buildings, etc.) that can affect operation of the climate control system 225. Real-time location data can provide opportunity for climate control optimization based on real-time traffic data and daylight status. Furthermore, a fixed specific route may require door opening events of the transport vehicle 200 of varying frequency and duration.

At 310, the controller 230 receives climate control data providing operational status information of the climate control system 225. The climate control data can include, for example, from the one or more internal space temperature sensors 252, internal space humidity data from the one or more internal space humidity sensors 254, a discharge temperature of conditioned air directed into the internal space from the discharge temperature sensor 292. In some embodiments, the climate control data can also include a desired temperature setpoint within the internal space, a desired humidity setpoint within the internal space, and a discharge temperature setpoint. Also, in some embodiments, the climate control data can include a suction and/or discharge pressure of the compressor 280, condition and/or usage information of the power system sensor 207, operating mode status of the climate control system 225, etc. Further, in some embodiments, the climate control data can include a current operating mode of the climate control system 225. Other climate control data can include, but is not limited to, air flow data, valve position data, differential pressure data, fault and status data on fans, pumps, valves, other control devices, fan speed data, pump data, etc.

At 315, the controller 230 receives passenger/load data providing passenger/load information travelling in the transport vehicle 200. The passenger/load data can include, for example, the current number and duration of passengers (e.g., people, animals, etc.) within the internal space from the APC unit 215. In some embodiments, the passenger/load data can include door opening frequency and duration obtained from the door sensor 237. In some embodiments, when the cargo in the internal space are not passengers, the controller 230 can obtain desired temperature and humidity information as well as temperature and humidity impact information that is specific to the cargo being stored. The passenger/load data can be combined with fixed specific route data and/or customer complaint or other preference information to determine a desired temperature and/or humidity setpoint or other operating parameter settings for the climate control system 225.

The method 300 then proceeds to 320. While FIG. 3 illustrates 305, 310 and 315 happening concurrently, it will be appreciated that in other embodiments two or more of 305, 310 and 315 can occur sequentially in any particular order.

At 320, the controller 230 determines adjustment instructions of the climate control system 225 based on the geolocation specific data, the climate control data, and the passenger/load data.

In one example, the controller 230 can determine a projected humidity level within the internal space based on a measured internal space humidity level from the one or more internal space humidity sensors 254 obtained at 310 and the passenger/load data obtained at 315. In some embodiments, the passenger/load data can include the current number and duration of passengers within the internal space. It has been found that passengers (e.g., people, animals, etc.) have natural convention (often referred to as thermal plume) that can give off heat and moisture to the surrounding environment. The humidity level in the internal space can therefore be altered based on the thermal plume of the passengers within the internal space. The greater the number and duration of passengers in the internal space and the longer the passengers remain in the internal space, the greater the temperature and humidity level that the climate control system 225 would need to offset to effectively condition the internal space as required. In some embodiments, the passenger/load data can also include door opening frequency and duration obtained from the door sensor 237.

In some other embodiments, when the internal space includes cargo rather than passengers, the passenger/load data can include information on the size and type of cargo stored in the internal space as well as the required temperature and humidity for the internal space to maintain the cargo as well as information on the temperature and humidity impact of the cargo on the internal space.

Lab and simulation testing can be performed to model the effect of the passengers/cargo to the relative humidity and temperature within the internal space. Accordingly, the controller 230 can access a lookup table and/or formulas to determine the projected humidity level within the internal space based on the measured internal space humidity level and the passenger/load information.

The controller 230 can then generate adjustment instructions to adjust an operating mode of the climate control system 225 based on the determined projected humidity level and an ambient temperature at the location of the transport vehicle obtained by the data logging device 260. In this example, at high humidity levels the controller 230 could adjust the climate control system 225 to operate in a reheating operational mode that reheats cooled air to provide dehumidification of the internal space, and at low humidity levels, the control mode 230 could adjust the climate control system 225 to operate in an operational mode that cycles between active cooling and recirculation of space air in the internal space. It will be appreciated that the terms "high humidity levels" and "low humidity levels" can be determined by the user and based, for example, on the desired humidity levels in the internal space.

In another example, the controller 230 can determine a projected humidity level within the internal space based on a measured internal space humidity level from the one or more internal space humidity sensors 254 obtained at 310 and the passenger/load data obtained at 315. The passenger/ load data can include, for example, the current number and duration of passengers within the internal space, the door opening frequency and duration, and/or information on the required temperature and humidity for the internal space to maintain the cargo as well as information on the temperature and humidity impact of the cargo on the internal space.

In embodiments where the internal space includes cargo rather than passengers, the passenger/load data can include information on the size and type of cargo stored in the internal space as well as the required temperature and humidity for the internal space to maintain the cargo as well as information on the temperature and humidity impact of the cargo on the internal space.

Lab and simulation testing can be performed to model the effect of the passengers/cargo to the relative humidity and temperature within the internal space. Accordingly, the controller 230 can access a lookup table and/or formulas to determine the projected humidity level within the internal space based on the measured internal space humidity level and the passenger/load information.

The controller 230 can also determine a projected temperature level within the internal space based on a measured internal space temperature level from the one or more internal space temperature sensors 252 obtained at 310 and the passenger/load data obtained at 315. The passenger/load data can include, for example, the current number and duration of passengers within the internal space, the door opening frequency and duration, and/or information on the required temperature and humidity for the internal space to maintain the cargo as well as information on the temperature and humidity impact of the cargo on the internal space.

In embodiments where the internal space includes cargo rather than passengers, the passenger/load data can include information on the size and type of cargo stored in the internal space as well as the required temperature and humidity for the internal space to maintain the cargo as well as information on the temperature and humidity impact of the cargo on the internal space.

Lab and simulation testing can be performed to model the effect of the passengers/cargo to the relative humidity and temperature within the internal space. Accordingly, the controller 230 can access a lookup table and/or formulas to determine the projected temperature level within the internal space based on the measured internal space temperature level and the passenger/load information.

The controller 230 can then generate adjustment instructions to adjust an operating mode of the climate control system 225 based on the determined projected humidity level and the determined projected temperature level. In this example, at high humidity and/or temperature levels the controller 230 could adjust the climate control system 225 to operate in a reheating operational mode that reheats cooled air to provide dehumidification and heating of the internal space, and at low humidity and/or temperature levels, the control mode 230 could adjust the climate control system 225 to operate in an operational mode that cycles between active cooling and recirculation of space air in the internal space. It will be appreciated that the terms "high humidity levels" and "low humidity levels" can be determined by the user and based, for example, on the desired humidity levels in the internal space. Similarly, the terms "high temperature levels" and "low temperature levels" can be determined by the user and based, for example, on the desired temperature levels in the internal space.

In another example, the controller 230 can generate adjustment instructions to adjust a discharge temperature setpoint for conditioned air discharged into the internal space via the second air moving device 290. The adjustment instructions can be generated based on an ambient temperature level at the location of the transport vehicle 200 and an ambient humidity level at the location of the transport vehicle 200 obtained by the data logging device 260. The discharge temperature setpoint can be reset based on ambient air conditions (e.g., ambient temperature and/or ambient humidity) in either a linear or other identified curve so as to optimize performance and limit energy consumption. As an example, when the ambient temperature and ambient humidity is low while the climate control system 225 is in a cooling operating mode, the discharge temperature can be reset at a predetermined interval correlating to the ambient air conditions. In this specific case, the discharge temperature setpoint can be raised as the amount of cooling needed for the internal space could be lower. Similarly, during a heating operating mode, the discharge temperature setpoint can be lowered as the amount of heating needed for the internal space could be higher.

In yet another example, the controller 230 can generate adjustment instructions to adjust a discharge temperature setpoint for conditioned air discharged into the internal space via the second air moving device 290 and to adjust a desired temperature setpoint within the internal space. The adjustment instructions can be generated based on passenger/load data obtained at 315. As an example, the passengers/load data can indicate the volume of passengers/load in the internal space. When the climate control system 225 is in a cooling operating mode, the discharge temperature setpoint can be increased or decreased so that hotter or colder air can be provided to account for the volume of passengers/load. The adjustment of the discharge temperature setpoint can be based on either a linear or other identified curve so as to optimize performance and limit energy consumption. It will be appreciated that the effect of the volume of passengers/load on the discharge temperature setpoint can be determined based on simulation testing, experimental testing, etc. The passenger/load data can include, for example, the current number and duration of passengers within the internal space, the door opening frequency and duration, and/or information on the required temperature and humidity for the internal space to maintain the cargo as well as information on the temperature and humidity impact of the cargo on the internal space.

In embodiments where the internal space includes cargo rather than passengers, the passenger/load data can include information on the size and type of cargo stored in the internal space as well as the required temperature and humidity for the internal space to maintain the cargo as well as information on the temperature and humidity impact of the cargo on the internal space.

Lab and simulation testing can be performed to model the effect of the passengers/cargo to the relative humidity and temperature within the internal space. Accordingly, the controller 230 can access a lookup table and/or formulas to determine adjustment instructions for obtaining required adjustments for the discharge temperature setpoint and the desired temperature setpoint.

Also, in another example, the controller 230 can generate adjustment instructions to adjust a discharge temperature setpoint for conditioned air discharged into the internal space via the second air moving device 290 and to adjust a desired temperature setpoint within the internal space. The adjustment instructions can be generated based on geolocation specific data obtained at 305. The geolocation specific data can include, for example, a location of the transport vehicle 200 along a fixed specific route. Based on where the transport vehicle 200 is located along the fixed specific route, the controller 230 can generate adjustment instructions to adjust the discharge temperature setpoint and the desired temperature setpoint. As an example, at a given point in a fixed specific route at a given time, while the climate control system 225 is operating in a cooling operating mode, the discharge temperature setpoint can lowered so colder air can be provided to account for known direct sun exposure to the transport vehicle 200. The amount of adjustment of the discharge temperature setpoint can be adjusted based on either a linear or other identified curve so as to optimize performance and limit energy consumption. In another example, as the transport vehicle 200 approaches the end of a route or travels between a known route and a place of domicile (e.g. 'dead mileage' or 'dead running'), the controller 230 could automatically adjust to less aggressively modify an interior climate of the internal space to minimize energy loss after the transport vehicle 200 is taken out of service.

The method 300 then proceeds to 330.

At 330, operation of the climate control system 225 is adjusted based on the adjustment instructions determined at 320. In particular, the adjustment instructions determined at 320 can be used to, for example, adjust an operating mode of the climate control system 225, adjust a discharge temperature setpoint, adjust a desired temperature setpoint within the internal space of the transport vehicle 200, adjust a desired humidity setpoint within the internal space of the transport vehicle 200, and adjust a desired discharge temperature of conditioned air from the second air moving device 290 to the internal space of the transport vehicle 200. Each of the operating modes can require varying levels of energy consumption. As such, operating modes can be switched based on the defined variables in order to optimize performance of the system while still providing climate control acceptable for the application. Also, each of the operating modes can adjust operation of the compressor 280 and can vary the amount of energy required to operate the compressor 280. The method then returns to 305, 310, 315.

Aspects:

It is to be appreciated that any of aspects 1-11 can be combined with any of aspects 12-22.

Aspect 1. A method for autonomous climate control optimization of a transport vehicle having a climate control system, the method comprising:
  a controller receiving geolocation specific data providing location information of the transport vehicle;
  the controller receiving climate control data providing operational status information of the climate control system;
  the controller receiving passenger/load data providing passenger/load information travelling in the transport vehicle;
  the controller generating adjustment instructions of the climate control system based on the geolocation specific data, the climate control data, and the passenger/load data; and
  adjusting operation of the climate control system based on the adjustment instructions.

Aspect 2. The method of aspect 1, wherein the geolocation specific data includes at least one of real-time ambient humidity data at the location of the transport vehicle and real-time ambient temperature data at the location of the transport vehicle.

Aspect 3. The method of any one of aspects 1 and 2, wherein the passenger/load data includes a current number and duration of passengers within an internal space of the transport vehicle.

Aspect 4. The method of any of aspects 1-3, wherein the climate control data includes at least one of an internal space temperature within an internal space of the transport vehicle, an internal space humidity within the internal space of the transport vehicle, a discharge temperature of conditioned air directed into the internal space of the transport vehicle, a current operating mode of the climate control system, a desired temperature setpoint within the internal space, a desired humidity setpoint within the internal space, and a discharge temperature setpoint.

Aspect 5. The method of any of aspects 1-4, wherein adjusting operation of the climate control system includes at least one of adjusting an operating mode of the climate control system, adjusting a discharge temperature setpoint, adjusting a desired temperature setpoint, and adjusting a desired humidity setpoint.

Aspect 6. The method of any of aspects 1-5, wherein the geolocation specific data includes ambient temperature data at the location of the transport vehicle;
  wherein the climate control data includes an internal space humidity within an internal space of the transport vehicle;
  wherein the passenger/load data includes a current number and duration of passengers within an internal space of the transport vehicle;
  wherein the controller generating adjustment instructions of the climate control system based on the geolocation specific data, the climate control data, and the passenger/load data includes:
    determining a projected internal space humidity based on the internal space humidity and the current number and duration of passengers within the internal space, and
    determining an operating mode for the climate control system based on the ambient temperature data and the projected internal space humidity; and
  wherein adjusting operation of the climate control system based on the adjustment instructions includes adjusting the climate control system to operate in the determined operating mode.

Aspect 7. The method of any of aspects 1-6, wherein the climate control data includes an internal space temperature within an internal space of the transport vehicle and an internal space humidity within an internal space of the transport vehicle;
  wherein the passenger/load data includes a current number and duration of passengers within an internal space of the transport vehicle;
  wherein the controller generating adjustment instructions of the climate control system based on the geolocation specific data, the climate control data, and the passenger/load data includes:
    determining a projected internal space temperature based on the internal space temperature and the current number and duration of passengers within the internal space,
    determining a projected internal space humidity based on the internal space humidity and the current number and duration of passengers within the internal space, and
    determining an operating mode for the climate control system based on the projected internal space temperature and the projected internal space humidity; and
  wherein adjusting operation of the climate control system based on the adjustment instructions includes adjusting the climate control system to operate in the determined operating mode.

Aspect 8. The method of any of aspects 1-7, wherein the geolocation specific data includes ambient temperature data at the location of the transport vehicle and ambient humidity data at the location of the transport vehicle, wherein the controller generating adjustment instructions of the climate control system based on the geolocation specific data, the climate control data, and the passenger/load data includes:

determining an updated discharge temperature setpoint based on the ambient temperature data and the ambient humidity data; and wherein adjusting operation of the climate control system based on the adjustment instructions includes adjusting the climate control system to operate the refrigeration circuit to achieve the updated discharge temperature setpoint.

Aspect 9. The method of any of aspects 1-8, wherein the passenger/load data includes a current number and duration of passengers within an internal space of the transport vehicle;

wherein the controller generating adjustment instructions of the climate control system based on the geolocation specific data, the climate control data, and the passenger/load data includes:

determining an updated discharge temperature setpoint based on the current number and duration of passengers within the internal space, and determining an updated desired temperature setpoint for the internal space based on the current number and duration of passengers within the internal space; and wherein adjusting operation of the climate control system based on the adjustment instructions includes:

adjusting the climate control system to operate the refrigeration circuit to achieve the updated discharge temperature setpoint and to achieve the updated desired temperature setpoint.

Aspect 10. The method of any of aspects 1-9, wherein the geolocation specific data includes a location of the transport vehicle along a fixed specific route, wherein the controller generating adjustment instructions of the climate control system based on the geolocation specific data, the climate control data, and the passenger/load data includes:

determining an updated discharge temperature setpoint based on the location of the transport vehicle along the fixed specific route, and determining an updated desired temperature setpoint for the internal space based on the location of the transport vehicle along the fixed specific route; and wherein adjusting operation of the climate control system based on the adjustment instructions includes:

adjusting the climate control system to operate the refrigeration circuit to achieve the updated discharge temperature setpoint and to achieve the updated desired temperature setpoint.

Aspect 11. The method of any of aspects 1-10, wherein the geolocation specific data includes a location of the transport vehicle along a fixed specific route, wherein the controller generating adjustment instructions of the climate control system based on the geolocation specific data, the climate control data, and the passenger/load data includes:

determining an operating mode for the climate control system based on the location of the transport vehicle along the fixed specific route; and wherein adjusting operation of the climate control system based on the adjustment instructions includes adjusting the climate control system to operate in the determined operating mode.

Aspect 12. A climate control system for a transport vehicle comprising:

a refrigeration circuit configured to control an environmental condition of an internal space of the transport vehicle, wherein the refrigeration circuit includes a compressor, an exterior heat exchanger, and an interior heat exchanger;

a controller configured to control operation of the climate control system, wherein the controller is configured to:

receive geolocation specific data providing location information of the transport vehicle, receive climate control data providing operational status information of the climate control system;

receive passenger/load data providing passenger/load information travelling in the transport vehicle; and generate adjustment instructions of the climate control system based on the geolocation specific data, the climate control data, and the passenger/load data; and wherein the climate control system is configured to adjust operation of the climate control system based on the adjustment instructions.

Aspect 13. The climate control system of aspect 12, wherein the geolocation specific data includes at least one of real-time ambient humidity data at the location of the transport vehicle and real-time ambient temperature data at the location of the transport vehicle.

Aspect 14. The climate control system of any one of aspects 12-13, wherein the controller is configured to receive passenger/load data from an automatic passenger counter, and wherein the passenger/load data includes a current number and duration of passengers within an internal space of the transport vehicle.

Aspect 15. The climate control system of any of aspects 12-14, wherein the climate control data includes at least one of an internal space temperature within an internal space of the transport vehicle, an internal space humidity within the internal space of the transport vehicle, a discharge temperature of conditioned air directed into the internal space of the transport vehicle, a current operating mode of the climate control system, a desired temperature setpoint within the internal space, a desired humidity setpoint within the internal space, and a discharge temperature setpoint.

Aspect 16. The climate control system of any of aspects 12-15, wherein the controller is configured to adjust an operating mode of the climate control system, adjust a discharge temperature setpoint, adjust a desired temperature setpoint, and adjust a desired humidity setpoint.

Aspect 17. The climate control system of any of aspects 12-16, wherein the geolocation specific data includes ambient temperature data at the location of the transport vehicle;

wherein the climate control data includes an internal space humidity within an internal space of the transport vehicle;

wherein the controller is configured to receive the passenger/load data from an automatic passenger counter and wherein the passenger/load data includes a current number and duration of passengers within an internal space of the transport vehicle;

wherein the controller is configured to:

determine a projected internal space humidity based on the internal space humidity and the current number and duration of passengers within the internal space, and determine an operating mode for the climate control system based on the ambient temperature data and the projected internal space humidity; and wherein the climate control system is configured to adjust operation to the determined operating mode.

Aspect 18. The climate control system of any of aspects 12-17, wherein the climate control data includes an internal space temperature within an internal space of the transport vehicle and an internal space humidity within an internal space of the transport vehicle;
   wherein the passenger/load data includes a current number and duration of passengers within an internal space of the transport vehicle;
   wherein the controller is configured to:
   determine a projected internal space temperature based on the internal space temperature and the current number and duration of passengers within the internal space,
   determine a projected internal space humidity based on the internal space humidity and the current number and duration of passengers within the internal space, and
   determine an operating mode for the climate control system based on the projected internal space temperature and the projected internal space humidity; and
   wherein the climate control system is configured to adjust operation to the determined operating mode.

Aspect 19. The climate control system of any of aspects 12-18, wherein the geolocation specific data includes ambient temperature data at the location of the transport vehicle and ambient humidity data at the location of the transport vehicle,
   wherein the controller is configured to:
   determine an updated discharge temperature setpoint based on the ambient temperature data and the ambient humidity data; and
   wherein the climate control system is configured to adjust operation of the refrigeration circuit to achieve the updated discharge temperature setpoint.

Aspect 20. The climate control system of any of aspects 12-19, wherein the controller is configured to receive the passenger/load data from an automatic passenger counter and wherein the passenger/load data includes a current number and duration of passengers within an internal space of the transport vehicle;
   wherein the controller is configured to:
   determine an updated discharge temperature setpoint based on the current number and duration of passengers within the internal space, and
   determine an updated desired temperature setpoint for the internal space based on the current number and duration of passengers within the internal space; and
   wherein the climate control system is configured to adjust operation of the refrigeration circuit to achieve the updated discharge temperature setpoint and to achieve the updated desired temperature setpoint.

Aspect 21. The climate control system of any of aspects 12-20, wherein the geolocation specific data includes a location of the transport vehicle along a fixed specific route,
   wherein the controller is configured to:
   determine an updated discharge temperature setpoint based on the location of the transport vehicle along the fixed specific route, and
   determine an updated desired temperature setpoint for the internal space based on the location of the transport vehicle along the fixed specific route; and
   wherein the climate control system is configured to:
   adjust operation of the refrigeration circuit to achieve the updated discharge temperature setpoint and to achieve the updated desired temperature setpoint.

Aspect 22. The climate control system of any of aspects 12-20, wherein the geolocation specific data includes a location of the transport vehicle along a fixed specific route,
   wherein the controller is configured to:
   determine an operating mode for the climate control system based on the location of the transport vehicle along the fixed specific route; and
   wherein the climate control system is configured to:
   wherein the climate control system is configured to adjust operation to the determined operating mode.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for autonomous climate control optimization of a transport vehicle having a climate control system, the method comprising:
   a controller receiving geolocation specific data providing location information of the transport vehicle including at least one of real-time ambient humidity data at the location of the transport vehicle and real-time ambient temperature data at the location of the transport vehicle;
   the controller receiving climate control data providing operational status information of the climate control system including an internal space humidity within an internal space of the transport vehicle;
   the controller receiving passenger/load data providing passenger/load information travelling in the transport vehicle including a current number and duration of passengers within an internal space of the transport vehicle;
   the controller generating adjustment instructions of the climate control system based on the geolocation specific data, the climate control data, and the passenger/load data, wherein the controller generating the adjustment instructions includes:
   determining a projected internal space humidity based on the internal space humidity and the current number and duration of passengers within the internal space, and
   determining an operating mode for the climate control system based on the ambient temperature data and the projected internal space humidity; and
   adjusting operation of the climate control system based on the adjustment instructions_ to operate in the determined operating mode.

2. The method of claim 1, wherein the climate control data includes at least one of an internal space temperature within an internal space of the transport vehicle, a discharge temperature of conditioned air directed into the internal space of the transport vehicle, a current operating mode of the climate control system, a desired temperature setpoint within the internal space, a desired humidity setpoint within the internal space, and a discharge temperature setpoint.

3. The method of claim 1, wherein adjusting operation of the climate control system includes at least one of adjusting an operating mode of the climate control system, adjusting a discharge temperature setpoint, adjusting a desired temperature setpoint, and adjusting a desired humidity setpoint.

4. The method of claim 1, wherein the climate control data includes an internal space temperature within an internal space of the transport vehicle;
wherein the controller generating adjustment instructions of the climate control system based on the geolocation specific data, the climate control data, and the passenger/load data includes:
determining a projected internal space temperature based on the internal space temperature and the current number and duration of passengers within the internal space, and
determining an operating mode for the climate control system based on the projected internal space temperature and the projected internal space humidity.

5. The method of claim 1,
wherein the controller generating adjustment instructions of the climate control system based on the geolocation specific data, the climate control data, and the passenger/load data includes:
determining an updated discharge temperature setpoint based on the ambient temperature data and the ambient humidity data; and
wherein adjusting operation of the climate control system based on the adjustment instructions includes adjusting the climate control system to operate the refrigeration circuit to achieve the updated discharge temperature setpoint.

6. The method of claim 1,
wherein the controller generating adjustment instructions of the climate control system based on the geolocation specific data, the climate control data, and the passenger/load data includes:
determining an updated discharge temperature setpoint based on the current number and duration of passengers within the internal space, and
determining an updated desired temperature setpoint for the internal space based on the current number and duration of passengers within the internal space; and
wherein adjusting operation of the climate control system based on the adjustment instructions includes:
adjusting the climate control system to operate the refrigeration circuit to achieve the updated discharge temperature setpoint and to achieve the updated desired temperature setpoint.

7. The method of claim 1, wherein the geolocation specific data includes a location of the transport vehicle along a fixed specific route,
wherein the controller generating adjustment instructions of the climate control system based on the geolocation specific data, the climate control data, and the passenger/load data includes:
determining an updated discharge temperature setpoint based on the location of the transport vehicle along the fixed specific route, and
determining an updated desired temperature setpoint for the internal space based on the location of the transport vehicle along the fixed specific route; and wherein adjusting operation of the climate control system based on the adjustment instructions includes:
adjusting the climate control system to operate the refrigeration circuit to achieve the updated discharge temperature setpoint and to achieve the updated desired temperature setpoint.

8. A climate control system for a transport vehicle comprising:
a refrigeration circuit configured to control an environmental condition of an internal space of the transport vehicle, wherein the refrigeration circuit includes a compressor, an exterior heat exchanger, and an interior heat exchanger;
a controller configured to control operation of the climate control system, wherein the controller is configured to:
receive geolocation specific data providing location information of the transport vehicle including at least one of real-time ambient humidity data at the location of the transport vehicle and real-time ambient temperature data at the location of the transport vehicle,
receive climate control data providing operational status information of the climate control system including an internal space humidity within an internal space of the transport vehicle;
receive passenger/load data providing passenger/load information travelling in the transport vehicle including a current number and duration of passengers within an internal space of the transport vehicle; and
generate adjustment instructions of the climate control system based on the geolocation specific data, the climate control data, and the passenger/load data, wherein the controller is configured to generate adjustment instructions by being configured to:
determine a projected internal space humidity based on the internal space humidity and the current number and duration of passengers within the internal space, and
determine an operating mode for the climate control system based on the ambient temperature data and the projected internal space humidity; and
wherein the climate control system is configured to adjust operation of the climate control system based on the adjustment instructions to operate in the determined operating mode.

9. The climate control system of claim 8, wherein the controller is configured to receive passenger/load data from an automatic passenger counter.

10. The climate control system of claim 8, wherein the climate control data includes at least one of an internal space temperature within an internal space of the transport vehicle, a discharge temperature of conditioned air directed into the internal space of the transport vehicle, a current operating mode of the climate control system, a desired temperature setpoint within the internal space, a desired humidity setpoint within the internal space, and a discharge temperature setpoint.

11. The climate control system of claim 8, wherein the controller is configured to adjust an operating mode of the climate control system, adjust a discharge temperature setpoint, adjust a desired temperature setpoint, and adjust a desired humidity setpoint.

12. The climate control system of claim 8, wherein the climate control data includes an internal space temperature within an internal space of the transport vehicle;

wherein the controller is configured to:
  determine a projected internal space temperature based on the internal space temperature and the current number and duration of passengers within the internal space, and
  determine an operating mode for the climate control system based on the projected internal space temperature and the projected internal space humidity.

13. The climate control system of claim 8,
wherein the controller is configured to:
  determine an updated discharge temperature setpoint based on the ambient temperature data and the ambient humidity data; and
wherein the climate control system is configured to adjust operation of the refrigeration circuit to achieve the updated discharge temperature setpoint.

14. The climate control system of claim 8, wherein the controller is configured to receive the passenger/load data from an automatic passenger counter;
wherein the controller is configured to:
  determine an updated discharge temperature setpoint based on the current number and duration of passengers within the internal space, and
  determine an updated desired temperature setpoint for the internal space based on the current number and duration of passengers within the internal space; and
wherein the climate control system is configured to adjust operation of the refrigeration circuit to achieve the updated discharge temperature setpoint and to achieve the updated desired temperature setpoint.

15. The climate control system of claim 8, wherein the geolocation specific data includes a location of the transport vehicle along a fixed specific route,
wherein the controller is configured to:
  determine an updated discharge temperature setpoint based on the location of the transport vehicle along the fixed specific route, and
  determine an updated desired temperature setpoint for the internal space based on the location of the transport vehicle along the fixed specific route; and
wherein the climate control system is configured to:
  adjust operation of the refrigeration circuit to achieve the updated discharge temperature setpoint and to achieve the updated desired temperature setpoint.

16. The method of claim 1, wherein the geolocation specific data includes both of the real-time ambient humidity data at the location of the transport vehicle and the real-time ambient temperature data at the location of the transport vehicle.

17. The climate control system of claim 8, wherein the geolocation specific data includes both of the real-time ambient humidity data at the location of the transport vehicle and the real-time ambient temperature data at the location of the transport vehicle.

* * * * *